(12) United States Patent
Van Der Wijst et al.

(10) Patent No.: US 7,006,150 B2
(45) Date of Patent: Feb. 28, 2006

(54) INTERFACE MODULE FOR TV SETS

(75) Inventors: Hendricus Martinus Van Der Wijst, Veldhoven (NL); Ernst B. Bressau, Viersen (DE); Erwin Arnold, Eindhoven (NL); Henk Leeflang, Heerlen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 703 days.

(21) Appl. No.: 10/090,916

(22) Filed: Mar. 5, 2002

(65) Prior Publication Data

US 2002/0149707 A1 Oct. 17, 2002

(30) Foreign Application Priority Data

Mar. 8, 2001 (DE) ................. 011 05 737

(51) Int. Cl.
*H04N 5/44* (2006.01)
*H04N 5/65* (2006.01)

(52) U.S. Cl. .............. 348/554; 348/731; 348/820

(58) Field of Classification Search ........... 348/553, 348/554, 725, 731, 728, 818, 819, 820; 455/300, 455/301; H04N 5/44, 5/50, 5/65
See application file for complete search history.

(56) References Cited

U.S. PATENT DOCUMENTS

| 5,737,035 A | 4/1998 | Rotzoll ................. 348/725 |
| 6,765,626 B1 * | 7/2004 | Tanaka ................. 348/725 |
| 2004/0051815 A1 * | 3/2004 | Alpaiwalia et al. ....... 348/731 |

FOREIGN PATENT DOCUMENTS

WO     WO 9108645 A1 *  6/1991

* cited by examiner

*Primary Examiner*—Sherrie Hsia

(57) ABSTRACT

An interface module for receiving television signals or radio signals has several inputs and outputs for receiving and distributing picture and sound signals as well as control signals and at least one input for antenna signals. The interface module includes at least one tuner and a chip with a microprocessor including memory and data capture capability, and is capable of picture, color and sound decoding and signal processing units. The chip and the tuner are installed in a common casing.

14 Claims, 4 Drawing Sheets

INTERFACE MODULE FOR TV SETS

Figure 1:
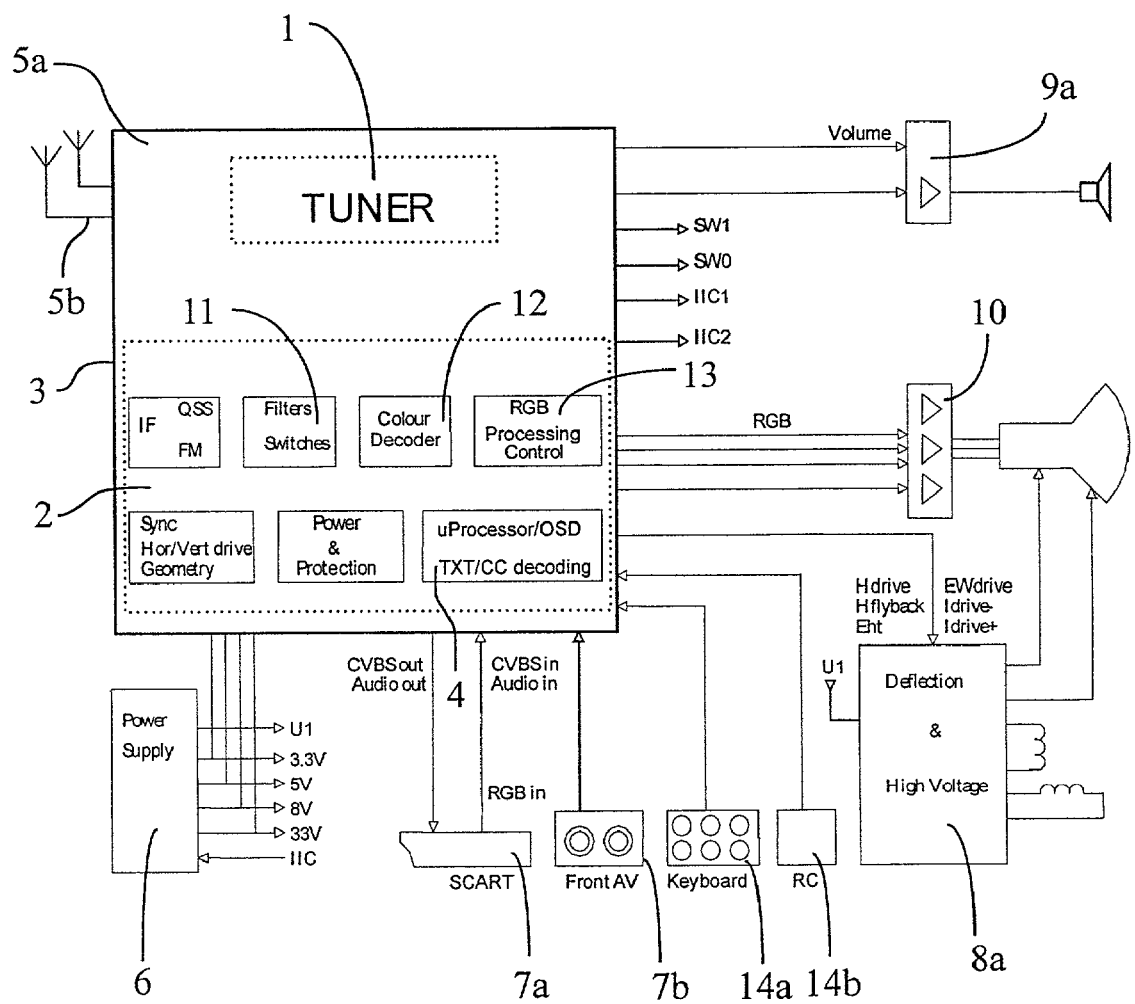

The invention relates to an interface module for receiving TV signals.

A highly integrated television tuner on a single microcircuit is known from U.S. Pat. No. 5,737,035. This circuit receives standard antenna signals and outputs a standard video baseband signal and a standard audio baseband signal. In addition, this circuit comprises video and audio processing means and can be controlled by an external computer or controller via a digital serial bus interface.

It is an object of the invention to modify a tuner for TV sets in such a way that more tasks and functions of a TV set are integrated in one unit to improve the EMC (ElectroMagneticCompatibility) performance of the whole TV set. Furthermore, it is an object of the invention that all EMC-sensitive elements are contained in a shielded module.

According to the invention, this object is achieved by means of an interface module for receiving television signals or radio signals having several inputs and outputs for receiving and distributing picture and sound signals as well as control signals and at least one input for antenna signals, the interface module comprising at least one tuner and a chip with a microprocessor including memory means and means for capturing data and with switching means, with picture, color and sound decoding means and with signal processing means, whereas the chip and the tuner are installed in one common casing.

The advantage of such an arrangement is that due to the high integration of the module and the shielding casing all connections of the different components are very short and completely shielded, which improves the resistance against interference and the EMC performance in general. Therefore, electromagnetic influence from outside on the tuner and all other included components and functional groups is reduced to a minimum. The short electrical connections between the chip and the tuner also improve the resistance against electromagnetic influence from other TV set components e.g. the CRT. This means that nearly no additional effort to fulfill EMC requirements is necessary for the TV set in which this kind of interface module is used. Furthermore, such an arrangement requires less space on the chassis PCB (Printed Circuit Board) of a TV set than several separate functional groups with additional shielding and other necessary EMC activities. Another advantage is that some functions, which are cheaper to realize by means of a microprocessor or which have to be changed to fit different TV sets, can be transferred to the microprocessor in the chip because the microprocessor makes these functions available anyway. This means that the interface module comprises fewer elements which reduces the manufacturing costs.

In one or more possible embodiments of the invention, mounting the chip and a tuner on a common printed circuit board has the advantage that the connections between the chip and the tuner are as short as possible, which saves significant space on the TV chassis. Moreover, cheaper TV set manufacturing is possible because all assembling sensitive components are inside the interface module and do not need to be shielded separately, so that the TV chassis manufacturer does not need to use a complicated soldering process.

If the Printed Circuit Board (PCB) has, in one or more possible embodiments of the invention, some parts outside the casing which are not covered by the casing, then it is possible to provide connecting interfaces on the PCB or other peripheral components like a module for controlling LCD panels on the same PCB as the interface module with the chip and the tuner. If such a control circuit for LCD panels is provided, it is a simple task to build a LCD TV set. Then only the interface module and an LCD panel are needed and nothing else. That is an attractive solution for TV set makers.

In one or more possible embodiments of the invention the resistance against electromagnetic influence from outside the casing is significantly improved by using a metallic casing. That makes additional shielding for the video processing means and the microprocessor superfluous.

In one or more possible embodiments of the invention, with the microprocessor in the chip and the tuner connected by a digital signal bus, the communication between the video processing means and microprocessor, on the one hand, and the tuner, on the other, could be much faster and more effective. That feature is also important for the possibility to shift functions from the tuner to the microprocessor part of the IC, which means that the tuner IC only requires a limited number of digital components to perform more complicated functions and tasks such as receiving signals of different TV systems.

In one or more possible embodiments of the invention, the whole interface module can easily be updated by means of software stored in programmable memory of the microprocessor. Therefore the tuner is appropriate for different TV sets with different functions and can be configured very flexibly. In this way the tuner can perform more sophisticated functions such as picture-in-picture, multistandard reception. If used in cheaper and smaller TV sets, fewer functions are realized. However, in both cases the same interface module with a chip and a tuner can be used. This customizing is especially Interesting for manufacturers developing TV sets in a wide range of sizes and prices. It is also possible that a TV set maker adds his own software for a special user interface such as a customized On-Screen-Display. This software is then stored in the one-time programmable memory part of the microprocessor. This is one possibility to initialize the interface module. Another advantage is that the TV set maker does not have to have knowledge about RF technique and EMC problems to design a TV Set.

In one or more possible embodiments of the invention, an interface module with integrated tuner and chip as offers additional possibilities to improve the performance of the signal processing. Deviations occurring during the manufacturing process can now be corrected by the interface module itself. The deviation is measured and then the deviation is stored in a correction table. The same can be done to the filters, especially the SAW (Surface Acoustic Wave) filters. It is then possible to measure the strength of the received signal and to adjust the filters and gain.

In one or more possible embodiments of the invention, the interface module comprises an microprocessor, so a much cheaper solution than traditional concepts for antenna diversity, which requires more than one tuner or more than one antenna, is possible. The interface module is designed so that the tuner part of the module can have more than one antenna input, controlled by the microprocessor. This means that the tuner can switch between various TV signals or can switch from receiving TV signals to receiving FM radio signals. For antenna diversity the RSSI (Receiver Signal Strength Indicator) feature is very important. This feature can now be integrated in the interface module.

In one or more possible embodiments of the invention, having at least two tuners in the casing is particularly useful for automotive applications. Since more and more cars are equipped with LCD-Screens for car navigation, there is a wish to use the screens for television, too. But the conditions for receiving TV signals are quite bad in moving cars; therefore a technique called antenna diversity is often used.

Figure 2:
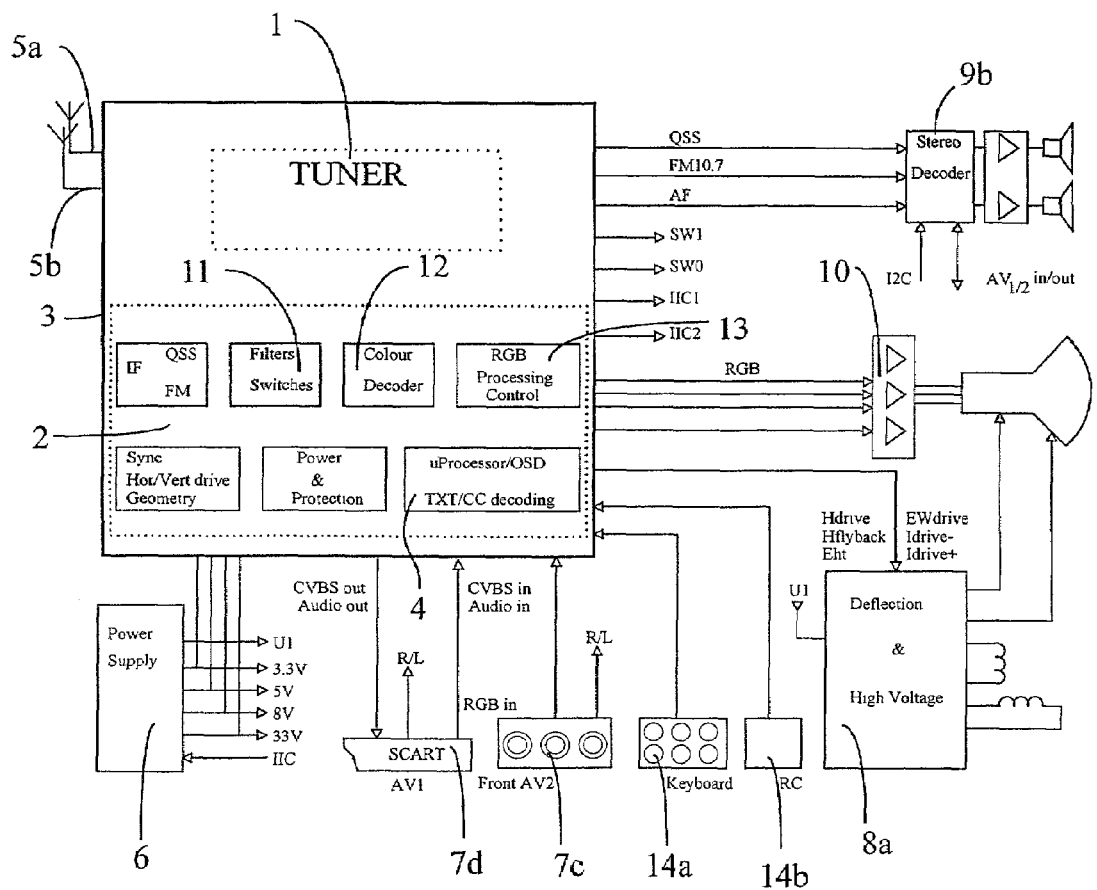
Figure 3:
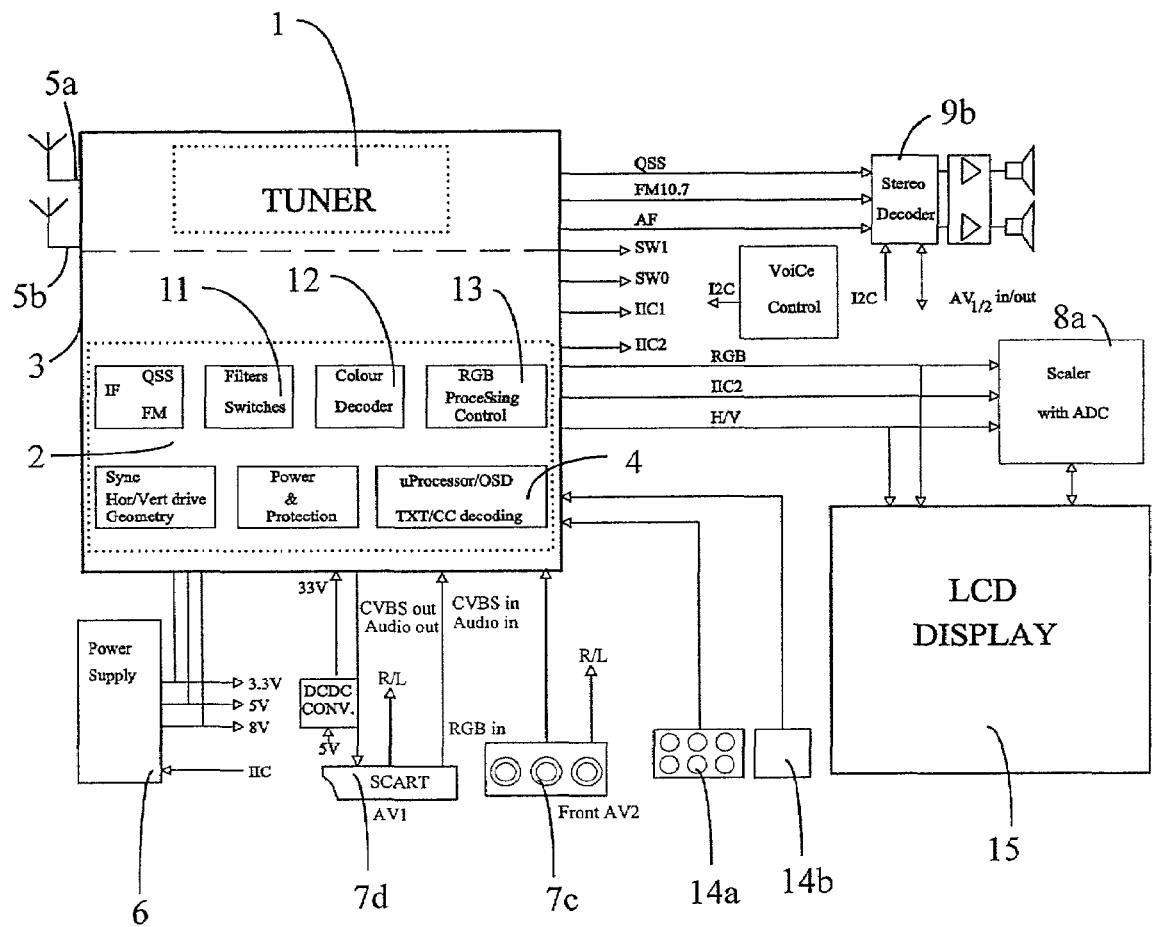
Figure 4:
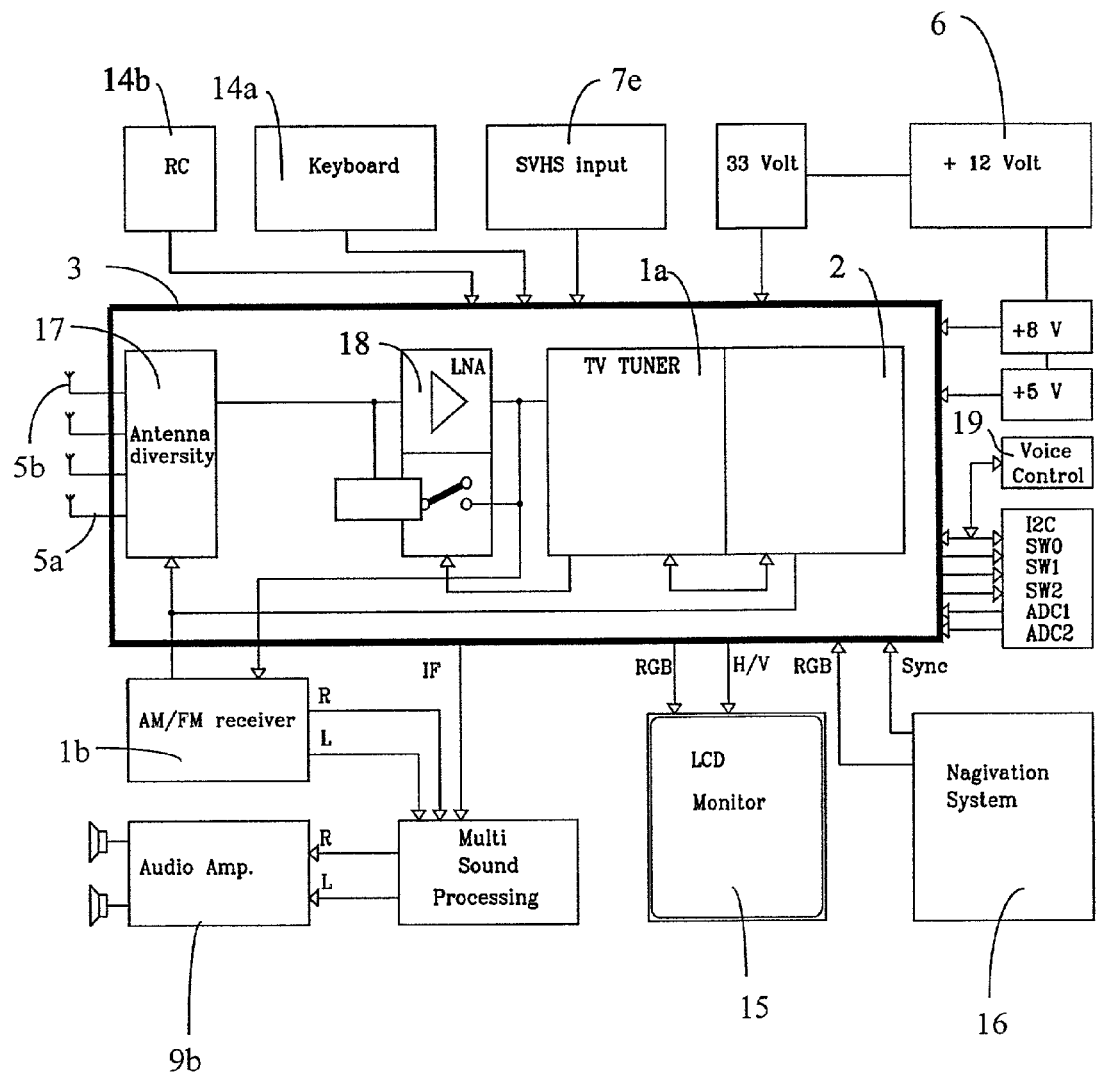

The invention will be explained in more detail with reference to the drawings, in which FIG. 1 shows a block diagram of an interface module for TV sets according to the invention with incoming and outgoing signals and the contents of the casing comprising the chip and the tuner, FIG. 2 shows a block diagram of an interface module for TV sets for receiving stereo audio signals, FIG. 3 shows a block diagram of an interface module for LCD TV sets and FIG. 4 shows a block diagram of an interface module used for TV sets in cars.

Tuner 1 and chip 2 are located in a common casing 3 as shown in FIG. 1 and mounted on a PCB (Printed Circuit Board). The casing 3 is preferably made of metal and can have a small hole on top where electrical contacts for programming are available. The chip is a One Chip solution which means that the chip 2 comprises several parts such as a microprocessor 4, teletext functions, filters and switches 11, signal processing units 13 and decoders 12 for video, color and sound signals. Since tuner 1 and chip 2 are arranged in a common casing 3, the required EMC performance, e.g. the resistance against electromagnetic interference from outside the casing 3, is easy to reach and in many respects improved significantly. The various parts within the chip 2 are controlled by the microprocessor 4. Also the tuner 1 which receives one or more antenna signals 5a, 5b is controlled by the microprocessor 4. Therefore, it is possible that functions of the tuner 1 are shifted to the microprocessor 4. The tuner 1 is able to receive both analog TV signals 5a and radio signals 5b, especially FM signals. An advanced version of the tuner 1 is further able to receive digital TV and radio signals. Furthermore, the casing 3 offers connecting interfaces for a deflection control 8a of a CRT, outputs for RGB signals 10 and at least one output 9 for sound signals which are to be amplified. Also the control of such an amplifier is integrated in the chip 2.

For processing signals of video recorders or DVD players the interface module has standardized connecting interfaces like SCART 7a, Cinch inputs 7b for picture and sound. Instead of the SCART connector it is also possible to have some Cinch in- and outputs, e.g. for the US area. User interfaces like keyboards 14a and remote control 14b are also provided.

A function, which could also be added to the microprocessor 4, is a Receiving Signal Strength Indicator, which could be implemented by an 8 bit ADC available in the microprocessor 4. The microprocessor 4 also allows the use of a 3-wire communication to the tuner part, which would be much faster. Another future function of the interface module is automatic alignment of the tuner, which could also be implemented by the microprocessor 4. Automatic alignment offers the possibility of a global tuner design, for all kinds of TV standards. The microprocessor 4 is also able to control the tuning voltage and to store the AGC (Automatic Gain Control) in its memory for faster tuning.

Provided with two antenna inputs, the arrangement is perfect for applications in car systems, which make use of the antenna diversity. If new functions were added to the tuner 1 and the chip 2, they could easily be made available by changing or modifying the software running in the microprocessor 4. So the manufacturer can vary functions just by software upgrades. Certain functions can also be reserved for certain TV sets, although the same interface module is used just with different software in the microprocessor 4.

The prototype size of the whole interface module is 114 mm×48 mm×14 mm. This shows that a very compact size is possible with the integration of the tuner 1 and the chip 2 in one casing. If the PCB of the interface module is a little enlarged than a so-termed scaler 8b, which is able to control an LCD panel 15 directly, and a few other components such as audio amplifier, EEPROM and voltage regulators can be added to the PCB. For an analog LCD display the scaler 8b is not needed. This means that an LCD TV set only comprises an interface module with the added components and an LCD panel 15. The set maker only needs to connect the two parts and install them in a box and the TV set is ready to be sold.

The interface module as shown in FIG. 2 offers the possibility of processing stereo audio signals. Therefore, an output for a stereo decoder 9b is provided. The inputs for audio and video signals 7c, 7d are also suitable for stereo audio signals.

Another interface module is shown in FIG. 3, which provides a control unit 8b to control an LCD panel 15. The control unit 8b is a so-called scaler 8b, which is able to control the pixels of the LCD panel 15. The scaler 8b is also mounted on the same PCB as the interface module, but outside the casing 3. For an analog display the scaler 8b is not needed, in that case the RGB and sync signals are steering the display unit directly.

The interface module is also applicable to Car-TV, as now explained with reference to FIG. 4 for example. In this case the ability to receive several antenna signals 5a, 5b is particularly important, because antenna diversity is often used in Car-TV. Besides the LCD monitor 15 there is an interface for a navigation computer 16. An external input for S-VHS video signals 7e and the opportunity for voice control 19 are provided as well. Some functions of the tuner 1a are shifted to a special car AM/FM receiver 1b outside the module. In return, other functions such as the antenna diversity control unit 17 or a low-noise amplifier 18 is built in the casing 3. The software functions needed for voice control 19 are Implemented by the microprocessor 4 of the chip 2. This means that further functions needed to integrate a cell phone into the arrangement can also be implemented by the chip 2.

What is claimed is:

1. An interface module for receiving television signals or radio signals, having several inputs and outputs for receiving and distributing picture and sound signals as well as control signals and at least one input for antenna signals, the interface module comprising at least one tuner and a chip with a microprocessor including memory means and means for capturing data and with switching means, with picture, color and sound decoding means and with signal processing means, wherein the chip and the tuner are installed in a common casing.

2. The interface module of claim 1, wherein the chip and the tuner are mounted on a common printed circuit board.

3. The interface module of claim 2, wherein the common printed circuit board comprises further peripheral components and connecting interfaces partly outside the casing.

4. The interface module of claim 1, wherein the common casing is made of an electromagnetic shielding material.

5. The interface module of claim 1, wherein the microprocessor in the chip and the tuner are connected by a digital signal bus.

6. The interface module of claim 5, wherein the microprocessor in the chip is designed to control the tuner via the digital signal bus and to perform tasks and functions of the tuner by software means stored in a one-time programmable memory of the microprocessor.

7. The interface module of claim 6, wherein the interface module is designed to be initialized by software stored in the one-time programmable memory of the microprocessor.

8. The interface module of claim 6, wherein the interface module is designed to store software for a customized user interface in the one-time programmable memory of the microprocessor.

9. The interface module of claim 6, wherein correction parameters obtained by tuner and module alignment and measurements can be stored in the memory of the microprocessor and that correction control circuits are provided.

10. The interface module of claim 6, wherein an automatic tracking filter alignment is provided.

11. The interface module of claim 6, wherein means for variable band switching are provided and that means for measuring the strength of the received antenna signals are provided.

12. The interface module of claim 6, wherein there are provided at least two antenna inputs.

13. The interface module of claim 1, wherein there are provided at least two antenna inputs.

14. The interface module of claim 13, wherein there is provided an additional FM radio RF input possibility and that the interface module is designed to be able to receive TV and FM radio signals.

* * * * *